(12) United States Patent
Paladugu et al.

(10) Patent No.: US 9,811,205 B2
(45) Date of Patent: Nov. 7, 2017

(54) VARIABLE TIME ANTI-ALIASING FILTER

(71) Applicant: Synaptics Incorporated, San Jose, CA (US)

(72) Inventors: Ranga Seshu Paladugu, San Jose, CA (US); Chunbo Liu, San Jose, CA (US); Zheming Li, San Francisco, CA (US)

(73) Assignee: Synaptics Incorporated, San Jose, CA (US)

( * ) Notice: Subject to any disclaimer, the term of this patent is extended or adjusted under 35 U.S.C. 154(b) by 115 days.

(21) Appl. No.: 14/869,595

(22) Filed: Sep. 29, 2015

(65) Prior Publication Data

US 2017/0090669 A1    Mar. 30, 2017

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01); *G06F 2203/04101* (2013.01)

(58) Field of Classification Search
CPC ................... G06F 3/0418; G06F 3/044; G06F 2203/04101; G01D 5/24
See application file for complete search history.

(56) References Cited

U.S. PATENT DOCUMENTS

| | | | |
|---|---|---|---|
| 4,862,136 A | 8/1989 | Birkner et al. | |
| 5,117,206 A | 5/1992 | Imamura | |
| 6,696,680 B2 | 2/2004 | Wada et al. | |
| 6,751,848 B2 | 6/2004 | Ooishi et al. | |
| 6,958,661 B2 | 10/2005 | Thompson et al. | |
| 7,300,807 B2 | 11/2007 | Coolbaugh et al. | |
| 7,411,774 B2 | 8/2008 | Leeper et al. | |
| 7,566,946 B2 | 7/2009 | Coolbaugh et al. | |
| 8,183,959 B2 | 5/2012 | Katta et al. | |
| 8,288,965 B1 | 10/2012 | Gordin et al. | |
| 8,559,207 B2 | 10/2013 | Kim et al. | |
| 8,704,576 B1 | 4/2014 | Groves et al. | |
| 2007/0252753 A1* | 11/2007 | Tiebout | G01S 7/352 342/175 |
| 2012/0218223 A1* | 8/2012 | Erdogan | G01R 27/2605 345/174 |
| 2013/0176269 A1* | 7/2013 | Sobel | G06F 3/0416 345/174 |

FOREIGN PATENT DOCUMENTS

WO    2013154797 A1    10/2013
WO    2014129317 A1    8/2014

* cited by examiner

*Primary Examiner* — Nelson Rosario
*Assistant Examiner* — Chun-Nan Lin
(74) *Attorney, Agent, or Firm* — Osha Liang LLP (57) ABSTRACT

A processing system for a capacitive sensing input device comprises a charge integrator, a circuit element having a first resistance, and a first switch coupled with the circuit element. The first circuit element is disposed in series with an input of the charge integrator. The first switch is configured to alter the first resistance to a second resistance when selectively closed during at least a portion of an integration phase of the charge integrator. The second resistance is lower than the first resistance.

14 Claims, 7 Drawing Sheets

```
COUPLING A CHARGE INTEGRATOR WITH A SENSOR ELECTRODE
THROUGH A CIRCUIT ELEMENT, WHEREIN THE CIRCUIT ELEMENT
HAS A FIRST RESISTANCE
610
```

↓

```
PROXIMATE A BEGINNING PORTION OF AN INTEGRATION PHASE,
SELECTIVELY CLOSING A FIRST SWITCH COUPLED WITH THE
CIRCUIT ELEMENT TO ALTER THE FIRST RESISTANCE TO A
SECOND RESISTANCE, WHEREIN THE SECOND RESISTANCE IS
LOWER THAN THE FIRST RESISTANCE
620
```

↓

```
OPERATING THE CHARGE INTEGRATOR IN THE INTEGRATION
PHASE TO INTEGRATE CHARGE ON THE SENSOR ELECTRODE
630
```

VARIABLE TIME ANTI-ALIASING FILTER

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones and tablet computers). Such touch screen input devices are typically superimposed upon or otherwise collocated with a display of the electronic system.

SUMMARY

In a processing system embodiment, the processing system for a capacitive sensing input device comprises a charge integrator, a circuit element having a first resistance, and a first switch coupled with the circuit element. The first circuit element is disposed in series with an input of the charge integrator. The first switch is configured to alter the first resistance to a second resistance when selectively closed during at least a portion of an integration phase of the charge integrator. The second resistance is lower than the first resistance.

BRIEF DESCRIPTION OF DRAWINGS

The drawings referred to in this Brief Description of Drawings should not be understood as being drawn to scale unless specifically noted. The accompanying drawings, which are incorporated in and form a part of the Description of Embodiments, illustrate various embodiments and, together with the Description of Embodiments, serve to explain principles discussed below, where like designations denote like elements.

DESCRIPTION OF EMBODIMENTS

The following Description of Embodiments is merely provided by way of example and not of limitation. Furthermore, there is no intention to be bound by any expressed or implied theory presented in the preceding Background, Summary, or Brief Description of Drawings or the following Description of Embodiments.

Overview of Discussion

Herein, various embodiments are described that provide input devices, processing systems, and methods that facilitate improved usability. In various embodiments described herein, the input device may be a capacitive sensing input device. A sensor electrode used for absolute capacitive sensing may couple various noises, such as display noise, along with capacitive inputs associates with input one or more input objects. As discussed herein, it is undesirable to integrate or otherwise measure this sensor coupled noise at the along with the signal(s) from the sensed input object(s). To reduce or eliminate this sensor coupled noise, a frontend filter can be employed. Herein, a frontend filter is called an anti-aliasing filter (AAF). The AAF is implemented as a low pass resistive capacitive (RC) filter, which passes only signals below a certain cutoff frequency. In an RC low pass filter, the cutoff frequency is determined by the values of resistance and capacitance utilized. In some embodiments, the size of the resistance utilized in order to set the cutoff frequency at a desired level, can cause a brief input voltage spike on a charge integrator when the filter is suddenly connected between a sensor electrode and an input of the charge integrator. This spike can be large enough to cause charge leakages in body diodes utilized in the charge integrator, thus resulting in an incorrect output from the charge integrator. Herein, techniques are described which vary resistance used in the RC filter from a lower initial resistance value to a higher final value so that the spike associated with suddenly and directly coupling the high resistance value to the input of the charge integrator does not occur because the high resistance is instead achieved in more than a single step. The variation occurs over time during a period of charge integration. This enables the use of a selected higher resistance for better filtering, without any degradation to the performance of the analog front end (i.e., the charge integrator) caused by instantaneously coupling only the high resistance to an input of the charge integrator.

Discussion begins with a description of an example input device with which or upon which various embodiments described herein may be implemented. An example sensor electrode pattern is then described. This is followed by description of an example processing system and some components thereof. The processing system may be utilized with as a portion of an input device, such as a capacitive sensing input device. Several example input devices with anti-aliasing filters are described in conjunction with some example timing diagrams. Operation of the input devices, processing systems, anti-aliasing filters, and components thereof are then further described in conjunction with description of an example method of capacitive sensing.

Example Input Device

Figure 1:
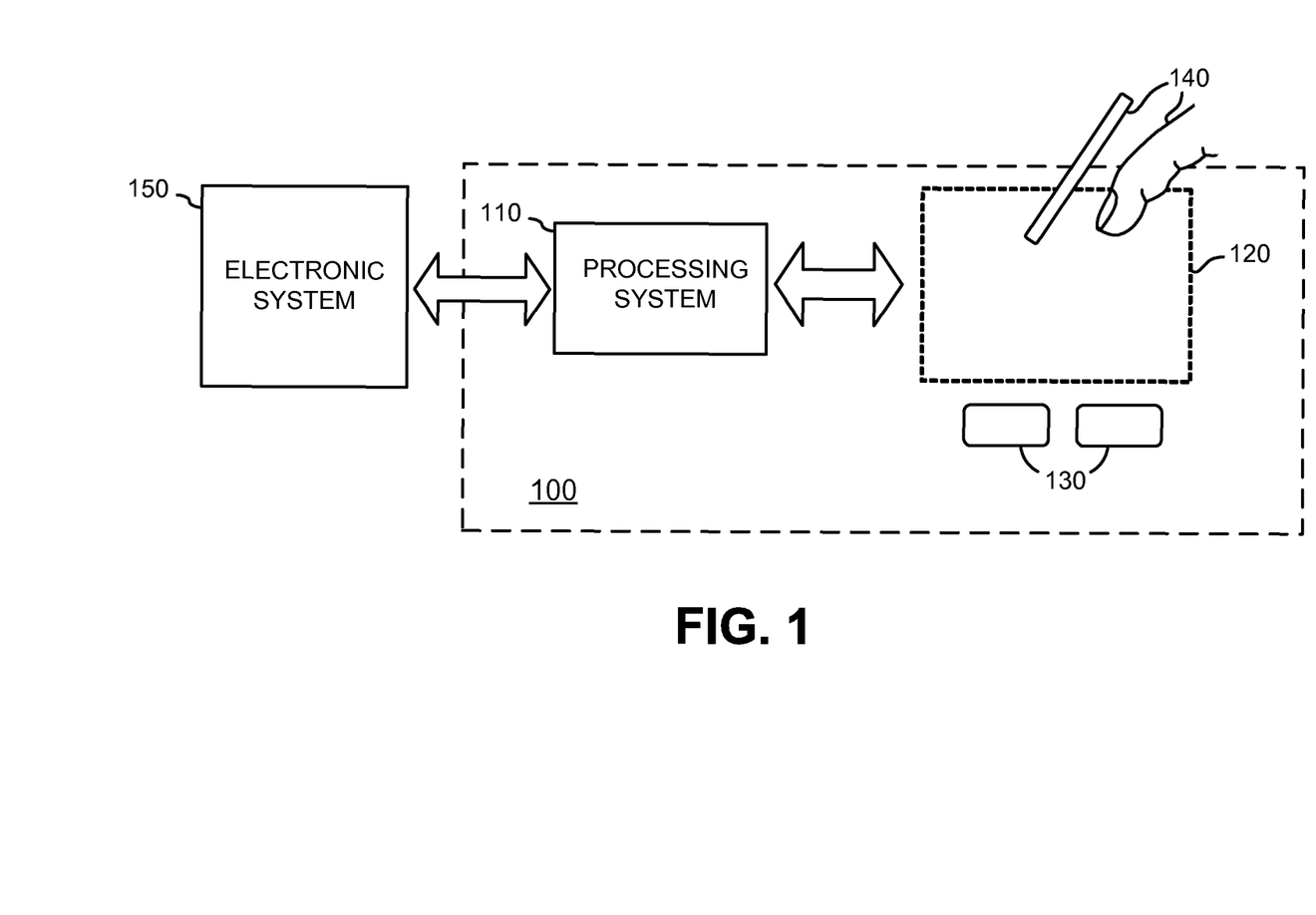
FIG. 1 is a block diagram of an example input device, in accordance with various embodiments.

Turning now to the figures, FIG. 1 is a block diagram of an exemplary input device 100, in accordance with various embodiments. Input device 100 may be configured to provide input to an electronic system/device 150. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic systems could be a host or a slave to the input device.

Input device 100 can be implemented as a physical part of an electronic system 150, or can be physically separate from electronic system 150. As appropriate, input device 100 may communicate with parts of the electronic system using any one or more of the following: buses, networks, and other wired or wireless interconnections. Examples include, but are not limited to: Inter-Integrated Circuit (I2C), Serial Peripheral Interface (SPI), Personal System 2 (PS/2), Universal Serial Bus (USB), Bluetooth®, Radio Frequency (RF), and Infrared Data Association (IrDA).

In FIG. 1, input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near input device 100, in which input device 100 is able to detect user input (e.g., user input provided by one or more input objects 140). The sizes, shapes, and locations of particular sensing regions may vary widely from embodiment to embodiment. In some embodiments, sensing region 120 extends from a surface of input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of input device 100, contact with an input surface (e.g., a touch surface) of input device 100, contact with an input surface of input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, sensing region 120 has a rectangular shape when projected onto an input surface of input device 100.

Input device 100 may utilize any combination of sensor components and sensing technologies to detect user input in the sensing region 120. Input device 100 comprises one or more sensing elements for detecting user input. As several non-limiting examples, input device 100 may use capacitive techniques.

Some implementations are configured to provide images that span one, two, three, or higher dimensional spaces. Some implementations are configured to provide projections of input along particular axes or planes.

In some capacitive implementations of input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Collectively transmitters and receivers may be referred to as sensor electrodes or sensor elements. Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g., other electromagnetic signals). Sensor electrodes may be dedicated transmitters or receivers, or may be configured to both transmit and receive. In some embodiments, one or more receiver electrodes may be operated to receive a resulting signal when no transmitter electrodes are transmitting (e.g., the transmitters are disabled). In this manner, the resulting signal represents noise detected in the operating environment of sensing region 120.

In FIG. 1, a processing system 110 is shown as part of input device 100. Processing system 110 is configured to operate the hardware of input device 100 to detect input in sensing region 120. Processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes. In some embodiments, processing system 110 also comprises electronically-readable instructions, such as firmware code, software code, and/or the like. In some embodiments, components composing processing system 110 are located together, such as near sensing element(s) of input device 100. In other embodiments, components of processing system 110 are physically separate with one or more components close to sensing element(s) of input device 100, and one or more components elsewhere. For example, input device 100 may be a peripheral coupled to a desktop computer, and processing system 110 may comprise software configured to run on a central processing unit of the desktop computer and one or more ICs (perhaps with associated firmware) separate from the central processing unit. As another example, input device 100 may be physically integrated in a phone, and processing system 110 may comprise circuits and firmware that are part of a main processor of the phone. In some embodiments, processing system 110 is dedicated to implementing input device 100. In other embodiments, processing system 110 also performs other functions, such as operating display screens, driving haptic actuators, etc.

Processing system 110 may be implemented as a set of modules that handle different functions of processing system 110. Each module may comprise circuitry that is a part of processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor modules configured to operate sensing element(s) or other structures to detect input and determination modules configured to determine positions of any inputs objects detected. For example, a sensor module may perform one or more of absolute capacitive sensing and transcapacitive sensing to detect inputs, and a determination module may determine positions of inputs based on the detected capacitances or changes thereto. In some embodiments, other modules or functionality may be included in processing system 110; for example, an identification module may be included and configured to identify gestures from detected inputs.

In some embodiments, processing system 110 responds to user input (or lack of user input) in sensing region 120 directly by causing one or more actions. Example actions include changing operation modes, as well as GUI actions such as cursor movement, selection, menu navigation, and other functions. In some embodiments, processing system 110 provides information about the input (or lack of input) to some part of the electronic system (e.g., to a central processing system of the electronic system that is separate from processing system 110, if such a separate central processing system exists). In some embodiments, some part of the electronic system processes information received from processing system 110 to act on user input, such as to facilitate a full range of actions, including mode changing actions and GUI actions.

For example, in some embodiments, processing system 110 operates the sensing element(s) of input device 100 to produce electrical signals indicative of input (or lack of input) in sensing region 120. Processing system 110 may perform any appropriate amount of processing on the electrical signals in producing the information provided to the electronic system. For example, processing system 110 may digitize analog electrical signals obtained from the sensor electrodes. As another example, processing system 110 may perform filtering or other signal conditioning. As yet another example, processing system 110 may subtract or otherwise account for a baseline, such that the information reflects a difference between the electrical signals and the baseline. As yet further examples, processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, input device 100 is implemented with additional input components that are operated by processing system 110 or by some other processing system. These additional input components may provide redundant functionality for input in sensing region 120, or some other functionality. FIG. 1 shows buttons 130 near sensing region 120 that can be used to facilitate selection of items using input device 100. Other types of additional input components include sliders, balls, wheels, switches, and the like. Conversely, in some embodiments, input device 100 may be implemented with no other input components.

In some embodiments, input device 100 may be a touch screen, and sensing region 120 overlaps at least part of an active area of a display screen. For example, input device 100 may comprise substantially transparent sensor electrodes overlaying the display screen and provide a touch screen interface for the associated electronic system 150. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. Input device 100 and the display screen may share physical elements. For example, some embodiments may utilize some of the same electrical components for displaying and sensing. As another example, the display screen may be operated in part or in total by processing system 110.

It should be understood that while many embodiments are described in the context of a fully functioning apparatus, the mechanisms are capable of being distributed as a program product (e.g., software) in a variety of forms. For example, the mechanisms that are described may be implemented and distributed as a software program on information bearing media that are readable by electronic processors (e.g., non-transitory computer-readable and/or recordable/writable information bearing media readable by processing system 110). Additionally, the embodiments apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other non-transitory storage technology.

Sensor Electrode Pattern

Figure 2:
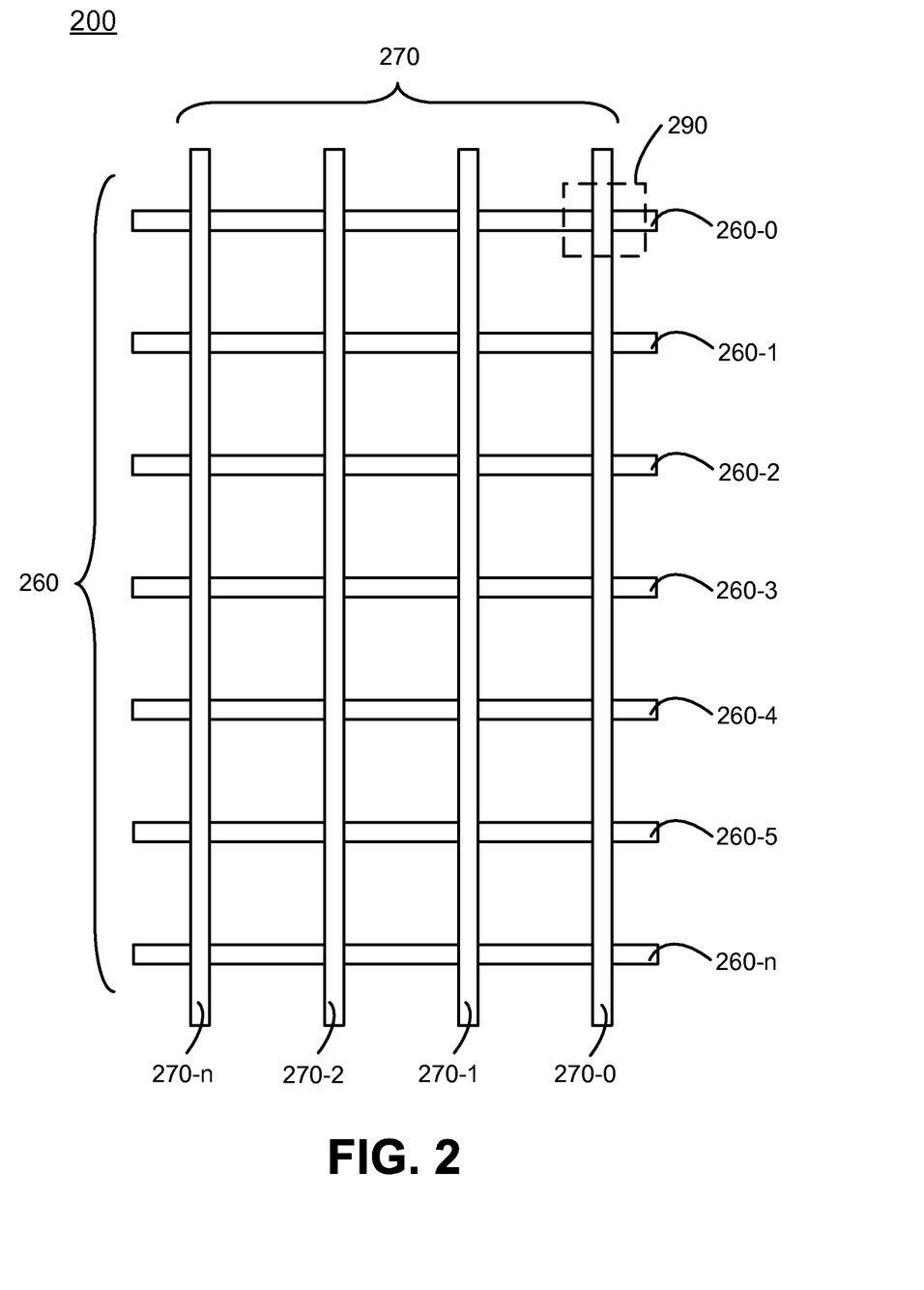
FIG. 2 shows a portion of an example sensor electrode pattern which may be utilized in a sensor to generate all or part of the sensing region of an input device, such as a touch screen, according to some embodiments.

FIG. 2 shows a portion of an example sensor electrode pattern 200 which may be utilized in a sensor to generate all or part of the sensing region of input device 100, according to various embodiments. Input device 100 is configured as a capacitive sensing input device when utilized with a capacitive sensor electrode pattern. For purposes of clarity of illustration and description, a non-limiting simple rectangular sensor electrode pattern 200 is illustrated which may be used for absolute capacitive sensing, transcapacitive sensing, or both. It is appreciated that numerous other sensor electrode patterns may be employed with the techniques described herein, including but not limited to: patterns with a single sensor electrode, patters with sensor electrodes that are shapes other than rectangles, patterns with a single set of sensor electrodes, patterns with two sets of sensor electrodes disposed in a single layer (without overlapping), patterns that utilize a common voltage electrode ($V_{COM}$) and/or other display electrodes of a display device to perform some aspects of capacitive sensing, and patterns that provide individual button electrodes. The illustrated sensor electrode pattern is made up of a first plurality of sensor electrodes 270 (270-0, 270-1, 270-2 . . . 270-$n$) and a second plurality of electrodes 260 (260-0, 260-1, 260-2 . . . 260-$n$) which overlay one another, in this example. In the illustrated example, touch sensing pixels are centered at locations where sensor electrodes used for transmitting and sensor electrode used for receiving cross. Capacitive pixel 290 illustrates one of the capacitive pixels generated by sensor electrode pattern 200 during transcapacitive sensing. It is appreciated that in a crossing sensor electrode pattern, such as the illustrated example, some form of insulating material or substrate is typically disposed between sensor electrodes 260 and sensor electrodes 270. However, in some embodiments, the second plurality of electrodes 260 and first plurality of electrodes 270 may be disposed on the same layer as one another through use of routing techniques and/or jumpers. In various embodiments, touch sensing includes sensing input objects anywhere in sensing region 120 and may comprise: no contact with any surfaces of the input device 100, contact with an input surface (e.g., a touch surface) of the input device 100, contact with an input surface of the input device 100 coupled with some amount of applied force or pressure, and/or a combination thereof.

When accomplishing transcapacitive measurements, capacitive pixels, such as capacitive pixel 290, are areas of localized capacitive coupling between a sensor electrode of sensor electrodes 260 and a sensor electrode of sensor of sensor electrodes 270. For example, the capacitive coupling between sensor electrodes 260 that are driven with a transmitter signal and sensor electrodes 270 that receive a resulting signal changes with the proximity and motion of input objects in the sensing region associated with sensor electrodes 260 and sensor electrodes 270.

In some embodiments, sensor electrode pattern 200 is "scanned" to determine these capacitive couplings. That is, the sensor electrodes 260 are driven to transmit transmitter signals. Transmitters may be operated such that one of sensor electrodes 260 transmits at one time, or multiple of sensor electrodes 260 transmit at the same time. Where multiple of sensor electrodes 260 transmit simultaneously, these multiple sensor electrodes may transmit the same transmitter signal and produce an effectively larger "transmitter electrode," or these multiple sensor electrodes may transmit different transmitter signals. For example, multiple sensor electrodes 260 may transmit different transmitter signals according to one or more coding schemes that enable their combined effects on the resulting signals received with sensor electrodes 270 to be independently determined.

In an embodiment wherein sensor electrodes 260 are used to transmit signals for transcapacitive sensing, sensor electrodes 270 may be operated singly or multiply to acquire resulting signals. The resulting signals may be used to determine measurements of the capacitive couplings at the capacitive pixels.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

In some embodiments, one or more sensor electrodes 260 or 270 may be operated to perform absolute capacitive sensing at a particular instance of time. For example, sensor electrode 270-0 may be charged and then the capacitance associated with sensor electrode 270-0 may be measured. In such an embodiment, an input object 140 interacting with sensor electrode 270-0 alters the electric field near sensor electrode 270-0, thus changing the measured capacitive coupling. In this same manner, a plurality of sensor electrodes 270 may be used to measure absolute capacitance and/or a plurality of sensor electrodes 260 may be used to measure absolute capacitance. It should be appreciated that when performing absolute capacitance measurements the labels of "receiver electrode" and "transmitter electrode" lose the significance that they have in transcapacitive measurement techniques, and instead a sensor electrode 260 or 270 may simply be referred to as a "sensor electrode" or may even be referred to as a "receiver electrode" since any sensor electrode used for absolute capacitive sensing is used for receiving.

By performing absolute capacitive sensing with a plurality or all of the sensor electrodes aligned along a common axis, the absolute capacitances that are measured may be used to produce a capacitive profile with respect to those sensor electrodes. With reference to FIG. 2, for example, a first absolute capacitive profile can be produced from absolute capacitance measurements made with sensor electrodes 260. With continued reference to FIG. 2, a second absolute capacitive profile that is substantially orthogonal to the first absolute capacitive profile can be produced from absolute capacitance measurements obtained from sensor electrodes 270. Such "X and Y axis" absolute capacitive profiles can be utilized to determine the location of one or more input objects with respect to a sensing region associates with sensor electrode pattern 200.

Example Processing System

Figure 3:
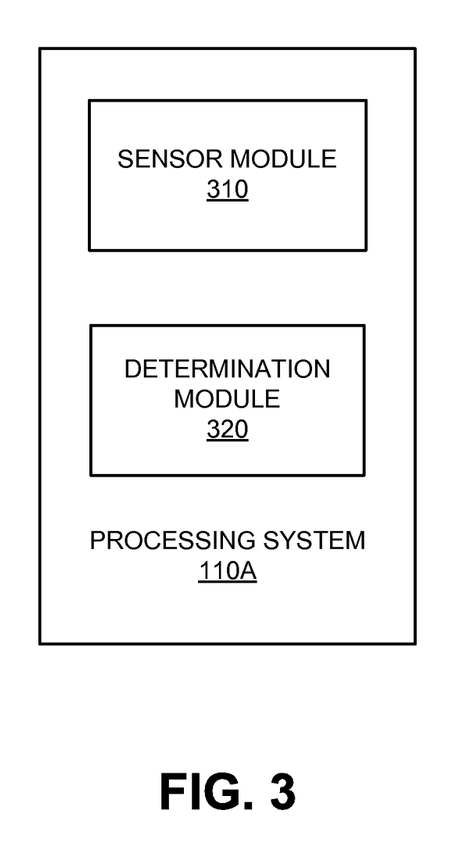
FIG. 3 shows a block diagram of an example processing system, according to various embodiment.

FIG. 3 illustrates a block diagram of some components of an example processing system 110A that may be utilized with an input device (e.g., in place of processing system 110 as part of input device 100), according to various embodiments. Processing system 110A may be implemented with one or more Application Specific Integrated Circuits (ASICSs), one or more Integrated Circuits (ICs), one or more controllers, or some combination thereof. In one embodiment, processing system 110A is communicatively coupled with one or more sensor electrodes of a first and second plurality (e.g., sensor electrodes 260 and 270) that implement a sensing region 120 of an input device 100. In some embodiments, processing system 110A and the input device 100 of which it is a part may be disposed in or communicatively coupled with an electronic system 150, such as a display device, computer, or other electronic system.

In one embodiment, processing system 110A includes: sensor module 310, and determination module 320. Processing system 110A and/or components thereof may be coupled with sensor electrodes of a sensor electrode pattern, such as sensor electrode pattern 200, among others. For example, sensor module 310 is coupled with one or more sensor electrodes (260, 270) of a sensor electrode pattern (e.g., sensor electrode pattern 200) of input device 100.

Sensor module 310 may be implemented as hardware (e.g., hardware logic and/or other circuitry) and/or as a combination of hardware and instructions stored in a non-transitory manner in a computer readable storage medium. Sensor module 310 comprises sensor circuitry and operates to interact with the sensor electrodes, of a sensor electrode pattern, that are utilized to generate a sensing region 120. This includes operating a first plurality of sensor electrodes (e.g., sensor electrodes 260) to be silent, to be driven with a transmitter signal, to be used for transcapacitive sensing, and/or to be used for absolute capacitive sensing. This also includes operating a second plurality of sensor electrodes (e.g., sensor electrodes 270) to be silent, to be driven with a transmitter signal, to be used for transcapacitive sensing, and/or to be used for absolute capacitive sensing.

During transcapacitive sensing, sensor module 310 operates to drive transmitter signals on one or more sensor electrodes of a first plurality of sensor electrodes (e.g., one or more of sensor electrodes 260). A transmitter signal may be a square wave, trapezoidal wave, or some other waveform. In a given time interval, sensor module 310 may drive or not drive a transmitter signal (waveform) on one or more of the plurality of sensor electrodes. Sensor module 310 may also be utilized to couple one or more of the first plurality of sensor electrodes to high impedance, ground, or to a constant voltage when not driving a transmitter signal on such sensor electrodes. In some embodiments, when performing transcapacitive sensing, sensor module 310 drives two or more sensor electrodes of a sensor electrode pattern at one time. When driving two or more sensor electrodes of a sensor electrode pattern at once, the transmitter signal may be coded according to a code. Sensor module 310 also operates to receive resulting signals, via a second plurality of sensor electrodes (e.g., one or more of sensor electrodes 270) during transcapacitive sensing. During transcapacitive sensing, received resulting signals correspond to and include effects corresponding to the transmitter signal(s) transmitted via the first plurality of sensor electrodes. These transmitted transmitter signals may be altered or changed in the resulting signal due to presence of an input object, stray capacitance, noise, interference, and/or circuit imperfections among other factors, and thus may differ slightly or greatly from their transmitted versions.

In absolute capacitive sensing, a sensor electrode is both driven and used to receive a resulting signal that results from the signal driven on to the sensor electrode. In this manner, during absolute capacitive sensing, sensor module 310 operates to drive a signal on to and receive a signal from one or more of sensor electrodes 260 or 270. During absolute capacitive sensing, the driven signal may be referred to as an absolute capacitive sensing signal, transmitter signal, or modulated signal, and it is driven through a routing trace that provides a communicative coupling between processing system 110A and the sensor electrode(s) with which absolute capacitive sensing is being conducted.

Sensor module 310 includes one or more electrical circuit elements. For example, in some embodiments, one or more of the electrical circuit elements disposed in sensor module 310 is an amplifier. Such an amplifier may be interchangeably referred to as an "amplifier," a "front-end amplifier," a "receiver," an "integrating amplifier," a "differential amplifier," or the like, and operates to receive a resulting signal at an input and provide an integrated voltage as an output. The resulting signal is from one or more sensor electrodes of a sensor electrode pattern, such as sensor electrode pattern 200. A single amplifier may be coupled with and used to receive a resulting signal from exclusively from a single sensor electrode, may receive signals from multiple sensor electrodes that are simultaneously coupled with the amplifier, or may receive signals from a plurality of sensor electrodes that are coupled one at a time to the amplifier. A sensor module 310 may include multiple amplifiers utilized in any of these manners. For example, in some embodiments, a first amplifier may be coupled with a first sensor electrode while a second amplifier is coupled with a second sensor electrode.

Logic of processing system 110A and/or sensor module 310 is used to selectively open and close switches in a programmed manner. For example, according to preprogramed logic, switches of processing system 110A are selectively opened and closed to couple a charge integrator with a sensor electrode, select a resistance or resistances that will be coupled between a charge integrator and a sensor electrode, decouple a charge integrator from a sensor electrode, and reset a charge integrator between periods of charge integration. The sequence and timing of the selective opening and closing of switches may be completely preprogrammed and/or may be programmed to dynamically perform in certain ways in response to measured conditions such as a level interference, type of interference, and/or frequency range of interference. Some non-limiting examples of the sequence and timing of switch opening and closing that may programmed into and controlled by logic of processing system 110A and/or sensor module 310 are presented in FIGS. 5A and 5B.

Determination module 320 may be implemented as hardware (e.g., hardware logic and/or other circuitry) and/or as a combination of hardware and instructions stored in a non-transitory manner in a computer readable storage medium.

In embodiments where transcapacitive sensing is performed, determination module 320 operates to compute/determine a measurement of a change in a transcapacitive capacitive coupling between a first and second sensor electrode during transcapacitive sensing. Determination module 320 then uses such measurements to determine the positional information comprising the position of an input object (if any) with respect to sensing region 120. The positional information can be determined from a capacitive image. The capacitive is determined by determination module 320 based upon resulting signals acquired by sensor module 310. It is appreciated that determination module 320 operates to decode and reassemble coded resulting signals to construct a capacitive image from a transcapacitive scan of a plurality of sensor electrodes.

In embodiments where absolute capacitive sensing is performed with sensor electrodes 260 and/or 270, determination module 320 also operates to compute/determine a measurement of absolute capacitive coupling. With respect to the techniques described herein, determination module 320 operates to determine an absolute capacitance of the sensor electrode (e.g., sensor electrode 270-0) during after the sensor electrode has been charged to a predetermined charge. Determination module 320 may use these measurements to determine whether or not an input object is present in a sensing region. Determination module 320 may also use these measurements to determine the position of an input object with respect to a sensing region. A variety of techniques for determining position of an input object, based on such measurements, are known in the art.

In some embodiments, processing system 110A comprises decision making logic which directs one or more portions of processing system 110A, such as sensor module 310 and/or determination module 320, to operate in a selected one of a plurality of different operating modes based on various inputs, to open/close switches at pre-programed times, to open/closed switches in response to certain measured conditions, and the like.

Example Input Devices

Figure 4A:
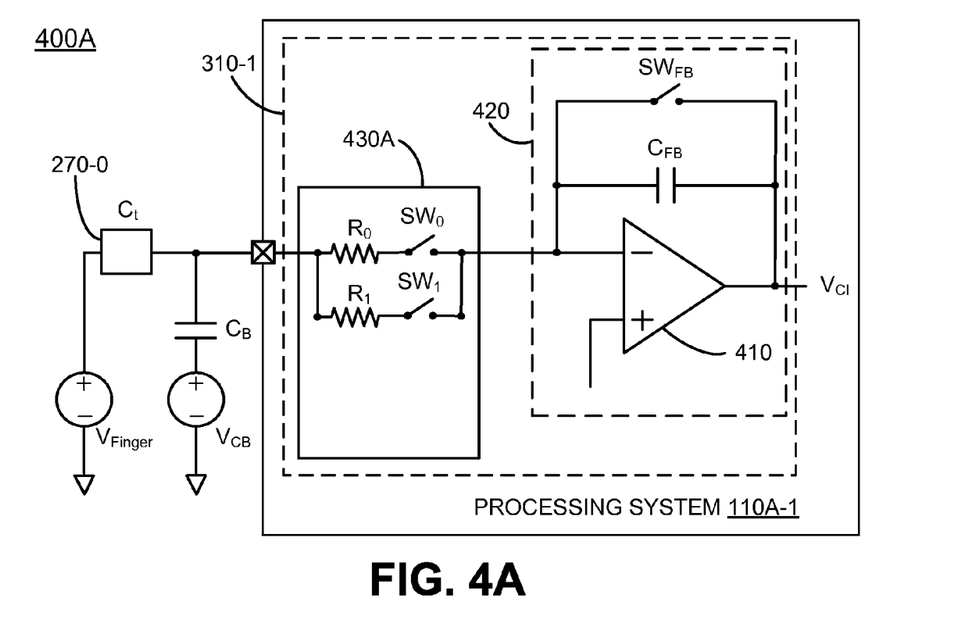
FIG. 4A illustrates an example input device, according to various embodiments.

FIG. 4A illustrates an example input device 400A, according to various embodiments. Input device 400A includes a processing system 110A-1 that is electrically coupled, such as by routing trace(s), with one or more sensor electrodes (sensor electrode 270-0 depicted) of a sensor electrode pattern (e.g., sensor electrode pattern 200) that forms a sensing region 120. Processing system 110A-1 includes sensor module 310-1 and is one embodiment of processing system 110A that is depicted in FIG. 3. Sensor module 310-1 is one embodiment of sensor module 310 of FIG. 3. As depicted, sensor module 310-1 includes a charge integrator 420, and a resistive circuit element 430A that provides a selectable amount of resistance coupled in series between an input of the charge integrator 420 and any sensor electrode(s) from which capacitances are measured.

Charge integrator 420, in various embodiments, comprises: amplifier 410, feedback capacitor $C_{FB}$, and switch $SW_{FB}$. Other implementations of a charge integrator, as known in the art, may be utilized. In operation, a modulated voltage, typically fixed for transcapacitive sensing or modulated for absolute capacitive sensing, is applied at the non-inverting input of amplifier 410. A feedback capacitor, $C_{FB}$, is coupled between the output and the inverting input of amplifier 410. A switch, $SW_{FB}$, is coupled in parallel with $C_{FB}$. During absolute capacitive sensing, a modulated voltage, such as a square wave, may be coupled with the non-inverting input and may vary for example, from 0V to 3V; a modulated voltage signal may be applied as $V_{CB}$ to measure the sensor electrode(s) for absolute capacitive sensing. $V_{Finger}$ represents a voltage introduced by a finger, or other input object 140, by interaction with sensor electrode 270-0.

During absolute capacitive sensing, the inverting input of amplifier 410 is coupled in series with a sensor electrode, such as sensor electrode 270-0, through resistive circuit element 430A. During charge integration with amplifier 410, feedback from the output of amplifier 410 allows the voltage potential at the inverting input of amplifier 410 to be set by and follow a voltage which is applied to the non-inverting input of amplifier 410.

Resistive circuit element 430A includes two parallel switches $SW_0$ and $SW_1$ and two parallel resistors $R_0$ and $R_1$ that are part of and coupled with resistive circuit element 430A. As depicted, $SW_0$ is in series with $R_0$, while $SW_1$ is in series with $R_1$. For purposes of example, in one embodiment: $R_0$ has a resistance of 4.5K Ohms; $SW_0$ has a resistance of 280 Ohms; $R_1$ has a resistance of 2.2K Ohms; and $SW_1$ has a resistance of 280 Ohms. When selectively closed by sensor module 310-1, these switches couple the resistance of their associated series resistor along with the resistance the switch itself (which is small but not negligible) in series between at least one sensor electrode and the inverting input of amplifier 410. While $SW_{FB}$ is open and one or more of $SW_0$ and $SW_1$ are closed, charge integrator 420 integrates a charge ($C_t$ and $C_B$) on a sensor electrode to which it is coupled and outputs a charge integration voltage, $V_{CI}$, representative of the total level of charge on $C_t$ plus the total amount of charge on $C_B$.

During the integration phase, a two element, single pole anti-aliasing low pass filter is formed by the selected resistance of resistive circuit element 430A along with the background capacitance, $C_t$ & $C_B$, which is typically about 50-200 pF of capacitance and which is charged by a voltage, $V_{CB}$, set and provided by processing system 110-A1. This low pass filter filters finger coupled noise that is coupled through $C_t$ during absolute capacitive sensing. The finger coupled noise may be any type of noise, but often includes charger noise and/or display noise. Display noise, for example, can be coupled from a display that is co-located with or part of a touch screen with the measured sensor electrode. Often the noise components have high order harmonics that are above 800 Khz. In one embodiment, $R_0$, when selected alone, provides a desired resistance which establishes a specified low, 3 dB cutoff frequency for this anti-aliasing low pass filter at frequency between 800 Khz and 1.5 Mhz. For example, in one embodiment, the value of $R_0$ is designed such that the 3 dB cutoff frequency for the low pass filter formed by $R_0$ and $C_B$ is 1 Mhz, and any signal above this frequency is blocked.

As previously discussed, suddenly switching in a resistor of the size of $R_0$ in a single step may cause a voltage spike into the inverting input of amplifier 410 which turns on the body diodes of switches $SW_0$-$SW_1$, 430A, and $SW_{FB}$, resulting in inaccurate integration of the charge $C_t$. A compromise would be to use a smaller resistor, but this would set the 3 dB cutoff frequency of the anti-aliasing filter higher and let too much noise through. To prevent this spike and still utilize an appropriately sized resistor for setting the 3 dB cutoff frequency in the 800 Khz to 1.5 Mhz range, in some embodiments, switch $SW_1$ can be closed by sensor module 310-1 at the same time or shortly before the closing of switch $SW_0$.

Figure 5A:
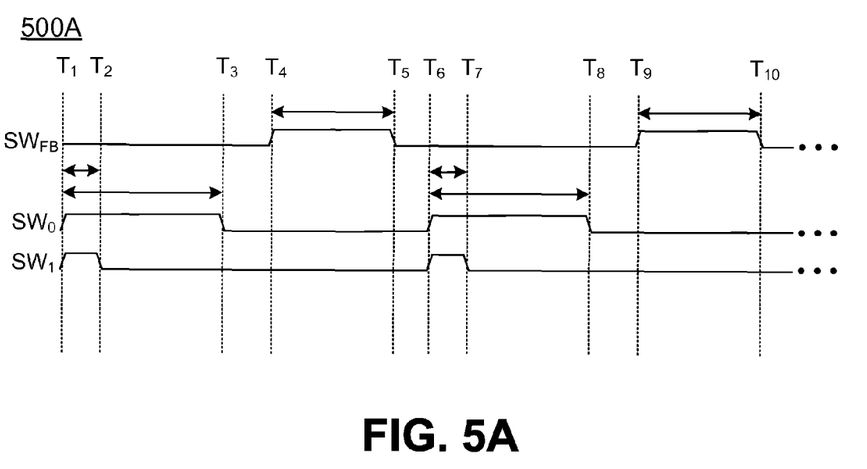
FIG. 5A illustrates a timing diagram for absolute capacitive sensing with the input device of FIG. 4A, according to some embodiments.

Referring now to FIG. 5A, FIG. 5A illustrates a timing diagram 500A for absolute capacitive sensing with the input device of FIG. 4A, according to some embodiments. In FIG. 5A, a high signal closes a switch and a low signal opens a switch. Time period T1 to T3 represents a first integration phase; T3 to T4 represents a delay, T4 to T5 represents a reset phase; T5 to T6 represents a delay; T6 to T8 represents a second integration phase; T8 to T9 represents a delay; and T9 to T10 represents a second reset phase.

With continued reference to FIG. 5A, at Time T1, $SW_{FB}$ is open and $SW_0$ and $SW_1$ are both closed. When $SW_{FB}$ is open and either or both of $SW_0$ and $SW_1$ are closed, integration begins. Consider an embodiment where $R_1$ is smaller than $R_0$ (e.g., half the size of $R_0$) such that when the first series resistance of $R_0$ and $SW_0$ is paralleled with the second series resistance for $R_1$ and $SW_1$, the total selected resistance of circuit element 430A is altered to becomes less than the resistance of $R_0$ plus the resistance of $SW_0$. After closing $SW_1$ at the same time or shortly before $SW_0$ and proximate the beginning portion of integration, $SW_1$ can then be opened by sensor module 310-1 later during the integration phase, at time T2, so that the resistance of circuit element 430A increases to the resistance of $R_0$ plus the resistance of $SW_1$. Thus, there is a short period of the integration phase, from T1 to T2, when a higher cutoff frequency is used, and then the remainder of the integration, from T2 to T3, takes place with the lower cutoff frequency that occurs when only $SW_0$ is closed.

With continued reference to FIG. 5A, when both $SW_0$ and $SW_1$ are opened, charge integration ceases at T3. $SW_{FB}$ is closed from T4 to T5 while both $SW_0$ and $SW_1$ are open, in order to reset $C_{FB}$ between periods of integration. After a delay from T5 to T6, another integration phase can then be initiated at T6, as described above, by closing $SW_1$ at the same time or shortly before closing $SW_0$ to initiate integration. After the beginning of the integration phase, at T7, $SW_1$ can be opened as described above so that integration can be carried out with an anti-aliasing low pass filter comprised of $C_B$ and the series resistance of $R_0$ plus the resistance of $SW_0$. After a delay from T8 to T9, $SW_{FB}$ is closed from T9 to T10 to reset $C_{FB}$. This process of integration and reset can be repeated numerous times.

Figure 4B:
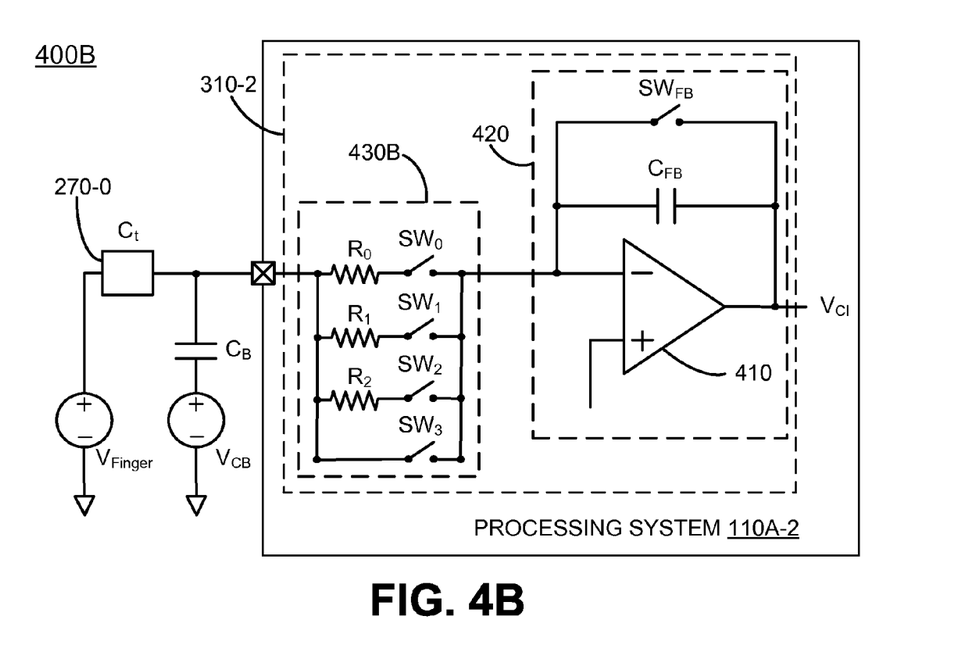
FIG. 4B illustrates an example input device, according to various embodiments.

Referring now to FIG. 4B, FIG. 4B illustrates an example input device 400B, according to various embodiments. Input device 400B includes a processing system 110A-2 that is electrically coupled, such as by routing trace(s), with one or more sensor electrodes (sensor electrode 270-0 depicted) of a sensor electrode pattern (e.g., sensor electrode pattern 200) that forms a sensing region 120. Processing system 110A-2 includes sensor module 310-2 and is one embodiment of processing system 110A that is depicted in FIG. 3. Sensor module 310-2 is one embodiment of sensor module 310 of FIG. 3. As depicted, sensor module 310-2 includes a charge integrator 420, and a resistive circuit element 430B that provides a selectable amount of resistance coupled in series between an input of the charge integrator 420 and any sensor electrode(s) from which capacitances are measured.

During absolute capacitive sensing, the inverting input of amplifier 410 is coupled in series with a sensor electrode, such as sensor electrode 270-0, through resistive circuit element 430B. Input device 400B differs from input device 400A in that resistive circuit element includes a greater number of switches associated with a greater number of resistive selections, such that more than just $R_1$ and $SW_1$ are available to alter (lower) the resistance of $R_0$ plus $SW_0$, and thus the overall resistance provided by circuit element 430B, to prevent a voltage spike at the beginning of integration with charge integrator 420.

Resistive circuit element 430B includes four parallel switches $SW_0$, $SW_1$, $SW_2$, $SW_3$ and three parallel resistors $R_0$, $R_1$, and $R_2$ that are part of and coupled with resistive circuit element 430B. As depicted: $SW_0$ is in series with $R_0$; $SW_1$ is in series with $R_1$; and $SW_2$ is in series with $R_2$. For purposes of example, in one embodiment: $R_0$ has a resistance of 4.5K Ohms; $SW_0$ has a resistance of 280 Ohms; $R_1$ has a resistance of 2.2K Ohms; $SW_1$ has a resistance of 280 Ohms; $R_2$ has a resistance of 1.1K Ohms, $SW_2$ has a resistance of 280 Ohms; and $SW_3$ has a resistance of 140 Ohms. When selectively closed by sensor module 310-1, switches $SW_0$, $SW_1$, and $SW_2$ the resistance of their associated series resistor along with their own switch resistance (which is small but not negligible) in series between the sensor electrode(s) being measured and the inverting input of amplifier 410. When switch $SW_3$ is closed, it couples only its switch resistance in series between the sensor electrode(s) being measured and the inverting input of amplifier 410. While $SW_{FB}$ is open and one or more of $SW_0$ and $SW_1$ are closed, charge integrator 420 integrates a charge $C_t+C_B$ on a sensor electrode to which it is coupled and outputs a charge integration voltage, WI representative of the total level of charge touch and background charge ($C_t+C_B$).

During the integration phase, a two element, single pole anti-aliasing low pass filter is formed by the selected resistance of resistive circuit element 430B along with the background capacitance, $C_t$ and $C_B$, which is typically about 50-200 pF of capacitance and which is charged by a voltage, $V_{CB}$, set and provided by processing system 110-A2. This low pass filter filters finger coupled noise that is coupled through $C_t$. In one embodiment, $R_0$, when selected alone, provides a desired resistance which establishes a specified low, 3 dB cutoff frequency for this anti-aliasing low pass filter at frequency between 800 Khz and 1.5 Mhz. For example, in one embodiment, the value of $R_0$ is designed such that the 3 dB cutoff frequency for the low pass filter formed by $R_0$ and $C_B$ is 1 Mhz, and any signal above this frequency is blocked.

As previously discussed, suddenly switching in a resistor of the size of $R_0$ in a single step may cause a voltage spike into the inverting input of amplifier 410 which turns on the body diodes of switches $SW_0$-$SW_4$, 430B, and $SW_{FB}$, resulting in inaccurate integration of the charge $C_t+C_B$. To prevent this spike and still utilize an appropriately sized resistor for setting the 3 dB cutoff frequency in the 800 Khz to 1.5 Mhz range, in some embodiments, one or more of switch $SW_1$, $SW_2$, and $SW_3$, can be closed by sensor module 310-1 at the same time or shortly before the closing of switch $SW_0$. As compared to circuit element 430A, circuit element 430B can alter the circuit element to a plurality of resistances in addition to the first resistance (achieved by switching in $R_1$) and the second resistance (achieved by switching in $R_1$ and $R_2$ at the same time).

Figure 5B:
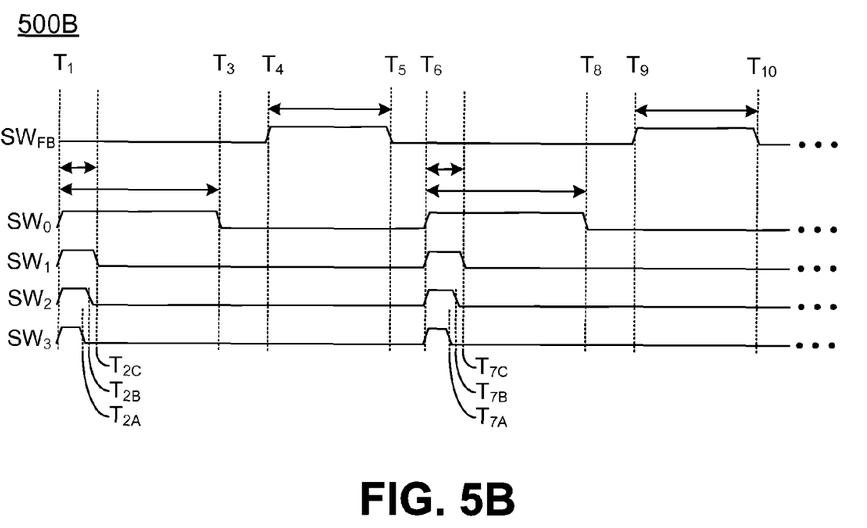
FIG. 5B illustrates a timing diagram for absolute capacitive sensing with the input device of FIG. 4B, according to some embodiments.

Referring now to FIG. 5B, FIG. 5B illustrates a timing diagram 500B for absolute capacitive sensing with the input device of FIG. 4B, according to some embodiments. In FIG. 5B, a high signal closes a switch and a low signal opens a switch. Time period T1 to T3 represents a first integration phase; T3 to T4 represents a delay, T4 to T5 represents a reset phase; T5 to T6 represents a delay; T6 to T8 represents a second integration phase; T8 to T9 represents a delay; and T9 to T10 represents a second reset phase.

With continued reference to FIG. 5B, at Time T1, $SW_{FB}$ is open and $SW_0$, $SW_1$, $SW_2$ and $SW_3$ are all closed. When $SW_{FB}$ is open and any combination of $SW_0$, $SW_1$, $SW_2$ and $SW_3$ are closed, integration begins. Consider the above described embodiment where $R_1$ is 4.5K Ohms and $SW_3$ is 140 Ohms, the total selected resistance of circuit element 430B is altered to become less than the resistance of 140 Ohms when $SW_3$ is closed in any combination with $SW_0$, $SW_1$, and $SW_2$. After closing $SW_1$, $SW_2$, and $SW_3$, at the same time as or shortly before $SW_0$ and proximate the beginning portion of integration, $SW_3$, $SW_2$, and $SW_1$, can then be opened by sensor module 310-1 later during the integration phase, at respective successive times T2A, T2B, and T2C, so that the resistance of circuit element 430B is stepped up through a plurality of discrete resistances until it is ultimately set to the resistance of $R_0$ plus the resistance of $SW_1$. Thus, there is a short period of the integration phase, from T1 to T2A, when a higher cutoff frequency is used. The cutoff frequency is lowered at T2A, lowered again at T2B, and lowered a final time at T2C after which the remainder of the integration phase, from T2C to T3, takes place with the lowest cutoff frequency that occurs when only $SW_0$ is closed.

With continued reference to FIG. 5A, when all of switches $SW_0$, $SW_1$, $SW_2$ and $SW_3$ are in an open state, charge integration ceases at T3. $SW_{FB}$ is closed from T4 to T5 while $SW_0$, $SW_1$, $SW_2$ and $SW_3$ remain open, in order to reset $C_{FB}$ between periods of integration. After a delay from T5 to T6, another integration phase can then be initiated at T6, as described above, by closing $SW_1$, $SW_2$ and $SW_3$ at the same time or shortly before closing $SW_0$ to initiate integration. After the beginning of the integration phase, at time T7A, $SW_3$ is opened as described above so that the overall resistance of circuit element 430B is stepped up. At time T7B, $SW_2$ is opened and the overall resistance of circuit element 430B is stepped up again. At time T7C, $SW_1$ is opened and the overall resistance of circuit 430B is stepped up a final time during this integration phase and integration is carried out from T7C to T8 with an anti-aliasing low pass filter comprised of $C_B$ and the series resistance of $R_0$ plus the resistance of $SW_0$. After a delay from T8 to T9, $SW_{FB}$ is closed from T9 to T10 to reset $C_{FB}$. This process of integration and reset can be repeated numerous times.

It should be appreciated that by measuring the amount and character of noise a processing system, such as processing system 110A-2, can dynamically adjust resistances of resistive element 430B (or similar resistive element with a greater or lesser number of possible resistive settings) to an appropriate level to filter out the measured noise (if any). For example, if no or very little noise is measured, sensor module 310-2 may be programmed to only close switch $SW_3$ during integration and essentially no filtering will take place. If very high frequency noise is present (such as above 3 MHz), a smaller resistance, such as R1, may be selected such that the cutoff frequency of the anti-aliasing low pass filter is raised even higher than 1.5 MHz to 3 MHz. Dynamically selecting a smaller resistance and therefore selecting a higher cutoff frequency, when appropriate based on measured interference, will also result in a shorter settling time and thus allow capacitive measurements to be made more quickly than when a larger resistance is selected by default. In some embodiments, for example, resistance setting options for resistive component 430B may be stored in a lookup table or other storage mechanism in association with various noise frequencies. In some such embodiments, processing system 110A-2 measures noise and then selects appropriate pre-programmed resistive settings and switch closing/opening instructions from the storage mechanism according to the frequency of the measured interference.

Example Methods of Operation

Figure 6A:
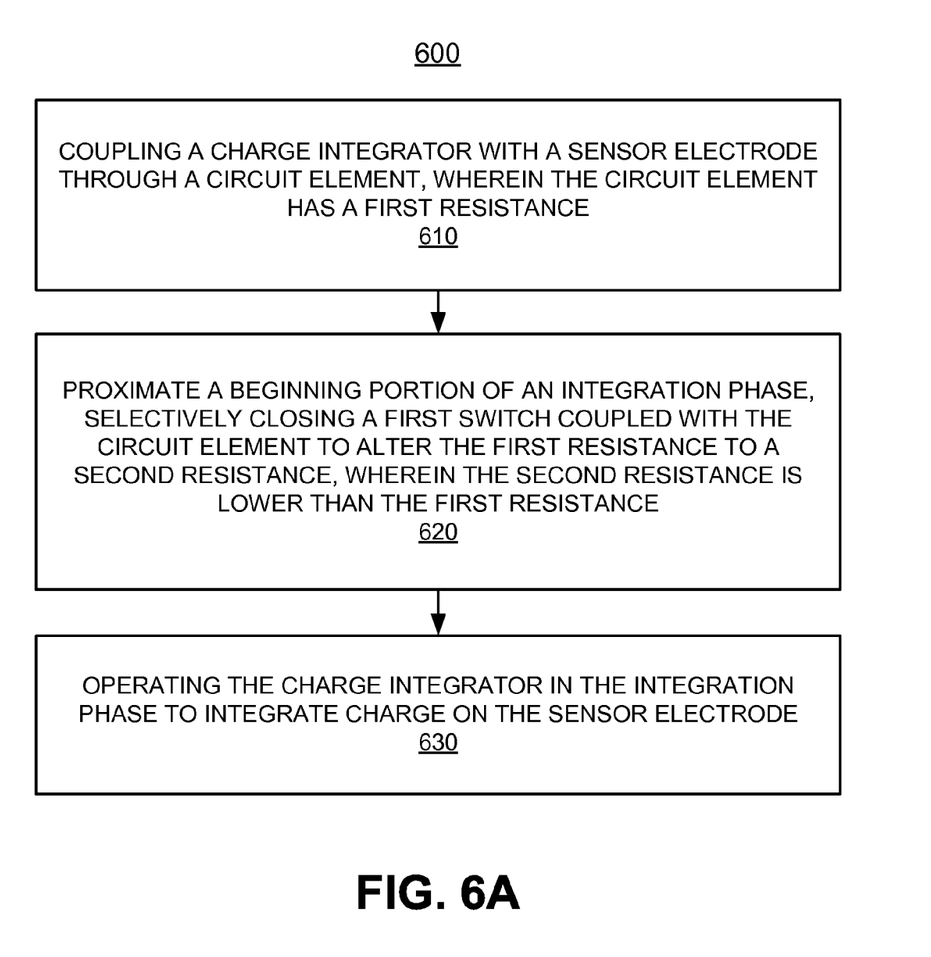
FIGS. 6A, 6B, and 6C illustrate a flow diagram for a method of capacitive sensing, according to various embodiments.
Figure 6B:
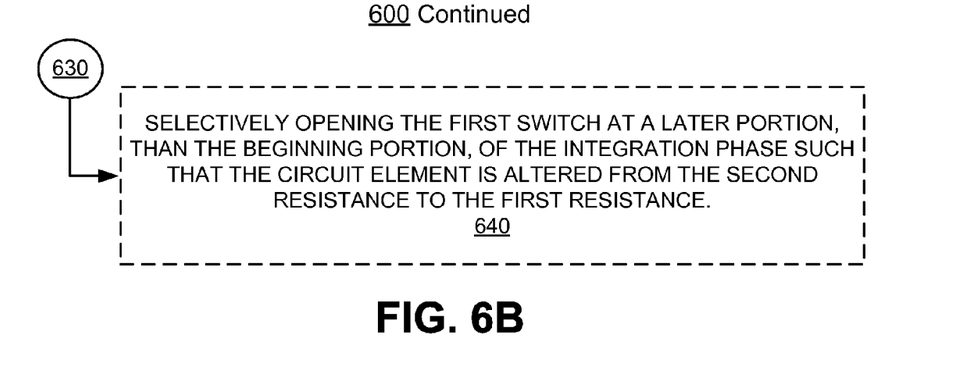
Figure 6C:
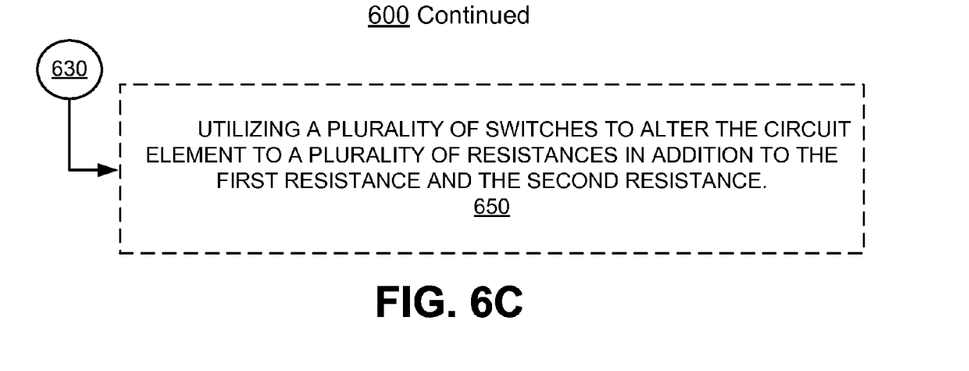

FIGS. 6A, 6B, and 6C illustrate a flow diagram 600 of a method of capacitive sensing, according to various embodiments. The method described below is a method of absolute capacitive sensing. Procedures of this method will be described with reference to elements and/or components of one or more of FIGS. 1, 2, 3, 4A, 4B, 5A, and 5B. It is appreciated that in some embodiments, the procedures may be performed in a different order than described, that some of the described procedures may not be performed, and/or that one or more additional procedures to those described may be performed.

With reference to FIG. 6A, at procedure 610 of flow diagram 600, in one embodiment, a charge integrator is coupled with a sensor electrode through a circuit element, wherein the circuit element has a first resistance. With reference to FIGS. 4A and 4B, this can comprise coupling charge integrator 420 with one or more sensor electrodes from which charge is being measured. The coupling occurs by closing one or more of the switches in resistive circuit element 430A (FIG. 4A) or 430B (FIG. 4B).

With continued reference to FIG. 6A, at procedure 620 of flow diagram 600, in one embodiment, proximate a beginning portion of an integration phase, selectively closing a first switch coupled with the circuit element to alter the first resistance to a second resistance, wherein the second resistance is lower than the first resistance. In FIGS. 4A and 4B, the integration phases begin when $SW_{FB}$ is open and any switches in circuit element 430 (430A or 430B) are closed. Consider an embodiment where $R_0$ is the largest resistor in circuit element 430 and is sized to set the predetermined cutoff frequency of an anti-aliasing low pass filter at between 800 KHz and 1.5 MHz (as discussed above). In order to prevent a voltage spike to the inverting input of amplifier 410, switch $SW_0$, which is in series with the largest resistance $R_0$ in the circuit element 430, is not closed first or alone. Instead, one or more other lower resistances in circuit element 430 (430A or 430B) are switched in first or else simultaneously with the closing of $SW_0$, so that the overall resistance of circuit element is low enough that the previously mentioned voltage spike does not occur or is reduced to a smaller size that causes no undesired effects. The acceptable level of resistance that does not cause a voltage spike, or keeps the voltage spike below the level which causes undesired effects to the body diodes within charge integrator 240 can be predetermined Switch settings to select this acceptable level of resistance are preprogrammed and stored in logic or other memory/storage of processing system 110A (i.e., 110A-1 or 110-A2 as described above) so that they may be selectively set by processing system 110A or a component thereof such as sensor module 310. With reference to FIG. 4A and timing diagram 5A, in one embodiment, this comprises closing switch $SW_1$ before or simultaneously with switch $SW_0$.

With continued reference to FIG. 6A, at procedure 630 of flow diagram 600, in one embodiment, the charge integrator is operated in an integration phase to integrate charge on the sensor electrode or electrodes to which it has been coupled. With $SW_{FB}$ open and one or more switches in circuit element 430 (430A, 430B) closed, charge integrator 420 integrates charge that is coupled to the inverting input of amplifier 410 and outputs a charge integration voltage, $V_{CI}$, that is representative of the level of charge.

Determination module 320 operates to interpret the value of $V_{CI}$ as a particular level of measured charge. When charges are integrated on enough of the sensor electrodes of a sensor electrode pattern (e.g., 200), determination module 320 operates to interpret the measured charges to determine whether, and if so where, an input object 140 is interacting with a sensor electrode pattern such as sensor electrode pattern 200.

With reference to FIG. 6B, as illustrated in procedure 640 of flow diagram 600, in some embodiments, the method as described in 610-630 further comprises selectively opening the first switch at a later portion, than the beginning portion, of the integration phase such that the circuit element is altered from the second resistance to the first resistance. With reference to FIGS. 4A and 5A, the beginning portion of the integration phase occurs proximate time T1, and opening of switch $SW_1$ is illustrated in FIG. 5A at time T2 which is after time T1. In the above discussed embodiment where $R_1$ is lower in resistance than $R_0$, opening $SW_1$ steps up the resistance of circuit element 430A to that of $R_0$ (or more accurately $R_0$ plus the resistance of $SW_0$, when $SW_0$ has a non-trivial resistance). In one embodiment, the resistance of $R_0$ is designed such that, when only switch $SW_0$ is closed in circuit element 430A, processing system 110A-1 has selectively set a cutoff frequency of a low pass anti-aliasing filter at a frequency between 800 Khz and 1.5 Mhz. In FIG. 5A, the integration phase takes place between T1 and T3, and integration takes place with the cutoff frequency set between 800 Khz and 1.5 Mhz from time T2 to time T3 (the exact cutoff frequency depends on the values of $C_B$ and $R_0$, but is somewhere in this range in an embodiment). In this manner, the resistance of the anti-aliasing filter is varied over time during a period of charge integration.

As illustrated in FIG. 5A, this process of initiating an integration phase with a lower, second resistance selected in circuit element 430A can be repeated one or some plurality of times by closing $SW_1$ before or simultaneously with $SW_0$ at the beginning of an integration phase. Likewise, after the beginning portion of these integration phases, $SW_1$ can be opened to alter circuit element 430A from the second resistance to a higher first resistance that is associated with only $SW_0$ being closed while the integration phase continues unabated.

With reference to FIG. 6C, as illustrated in procedure 650 of flow diagram 600, in some embodiments, the first switch is one of a plurality of other switches coupled with and a part of circuit element 430 (e.g., 430B) and the method as described in 610-630 further comprises utilizing the overall plurality of switches to alter circuit element 430 (e.g., 430B) to a plurality of resistances in addition to the first resistance and the second resistance. An example of such and embodiment has been illustrated and described herein in conjunction with FIGS. 4B and 5B. For example, if switch $SW_1$ is considered the first switch, then the plurality of other switches are $SW_0$, $SW_2$, and $SW_3$.

In some embodiments, at least three of the overall plurality of switches ($SW_0$, $SW_1$, $SW_2$, and $SW_3$ in this example) are simultaneously closed proximate the beginning portion of an integration phase. For example, and with reference to FIGS. 4B and 5B, this can comprise processing system 110A-2, or a component thereof such as sensor module 310-2, closing all of switches $SW_0$, $SW_1$, $SW_2$, and $SW_3$ simultaneously. Alternatively, one or more of $SW_1$, $SW_2$, and $SW_3$ may be closed slightly before $SW_0$ is closed. The closing of any one or more of switches $SW_0$, $SW_1$, $SW_2$, and $SW_3$ initiates the integration phase. Later, after the integration phase has begun, at least two of the closed switches are opened in succession such that circuit element 430B is stepped up through a plurality of discrete resistances to the first resistance, associated with only switch $SW_0$ being closed during the integration phase. One example of this is illustrated in FIG. 5B, where $SW_3$ is opened at time T2A, then $SW_2$ is opened at time T2B, and finally $SW_1$ is opened at time T2C. In this manner, the resistance of the anti-aliasing filter is varied over time during a period of charge integration.

In one embodiment, the resistance of $R_0$ is designed such that, when only switch $SW_0$ is closed in circuit element 430B, processing system 110A-2 has selectively set a cutoff frequency of a low pass anti-aliasing filter at a frequency between 800 Khz and 1.5 Mhz. In FIG. 5B, the integration phase takes place between T1 and T3, and integration takes place with the selectable cutoff frequency selectively set between 800 Khz and 1.5 Mhz from time T2C to time T3 (the exact cutoff frequency depends on the values of $C_T$, $C_B$ and $R_0$, but is somewhere in this range in an embodiment).

As illustrated in FIG. 5B, this process of initiating an integration phase with a lower, resistance selected in circuit element 430B and then stepping up to a higher resistance can be repeated one or some plurality of times. Likewise, after the beginning portion of these integration phases has been initiated with a lower resistance, one or more closed switches in circuit element 430B can be opened to alter circuit element 430B in one or more steps from the lower starting resistance to a selected higher resistance while the integration phase continues unabated.

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed.

What is claimed is:

1. A processing system for a capacitive sensing input device, said processing system comprising:
   a charge integrator;
   a circuit element having a first resistance, said circuit element disposed in series with an input of said charge integrator; and
   a first switch coupled with the circuit element and configured to alter said first resistance to a second resistance when selectively closed during at least a portion of an integration phase of said charge integrator,
   wherein said second resistance is lower than said first resistance,
   wherein said first switch is one of a plurality of other switches coupled with said circuit element,
   wherein said plurality of other switches are configured to open and close to alter said circuit element to a plurality of resistances in addition to said first resistance and said second resistance,
   wherein at least two of said plurality of other switches are configured to be closed proximate a beginning portion of said integration phase, and
   wherein said at least two of said closed switches are opened in succession, later in said integration phase, such that said circuit element is stepped up through a plurality of discrete resistances to said first resistance during said integration phase.

2. The processing system of claim 1, wherein said first switch is configured to close proximate said beginning portion of said integration phase.

3. The processing system of claim 2, wherein said first switch is configured to open at a later portion, than said beginning portion, of said integration phase such that said circuit element is altered from said second resistance to said first resistance.

4. The processing system of claim 3, wherein said first switch is configured to alter said circuit element from said second resistance to said first resistance during each of a plurality of integration phases of said charge integrator.

5. The processing system of claim 1, wherein said circuit element comprises an anti-aliasing low pass filter with a selectable cutoff frequency of between 800 Khz and 1.5 Mhz.

6. A capacitive sensing input device comprising:
   a plurality of sensor electrodes; and
   a processing system coupled with said plurality of sensor electrodes, said processing system configured to:
      couple a charge integrator with a sensor electrode through a circuit element, wherein said circuit element has a first resistance;
      operate said charge integrator in an integration phase to integrate charge on said sensor electrode; and selectively close a first switch coupled with said circuit element to alter said first resistance to a second resistance, wherein said second resistance is lower than said first resistance, wherein said first switch is one of a plurality of other switches coupled with said circuit element, wherein said plurality of other switches are configured to open and close to alter said circuit element to a plurality of resistances in addition to said first resistance and said second resistance, wherein at least two of said plurality of other switches are configured to be closed proximate a beginning portion of said integration phase, and wherein said at least two of said closed switches are configured to open in succession such that said circuit element is stepped up through a plurality of discrete resistances to said first resistance during said integration phase.

7. The capacitive sensing input device of claim 6, wherein said processing system is further configured to:
close said first switch proximate said beginning portion of said integration phase.

8. The capacitive sensing input device of claim 7, wherein said first switch is configured to open at a later portion, than said beginning portion, of said integration phase such that said circuit element is altered from said second resistance to said first resistance.

9. The capacitive sensing input device of claim 8, wherein said first switch is configured to alter said circuit element from said second resistance to said first resistance during each of a plurality of integration phases of said charge integrator.

10. The capacitive sensing input device of claim 6, wherein said circuit element comprises an anti-aliasing low pass filter with a selectable cutoff frequency of between 800 Khz and 1.5 Mhz.

11. A method of capacitive sensing comprising:
coupling a charge integrator with a sensor electrode through a circuit element, wherein said circuit element has a first resistance;

proximate a beginning portion of an integration phase, selectively closing a first switch coupled with said circuit element to alter said first resistance to a second resistance, wherein said second resistance is lower than said first resistance, wherein said first switch is one of a plurality of other switches coupled with said circuit element;

operating said charge integrator in said integration phase to integrate charge on said sensor electrode; and utilizing said plurality of other switches to alter said circuit element to a plurality of resistances in addition to said first resistance and said second resistance, wherein utilizing said plurality of other switches comprises:
closing at least two of said plurality of other switches proximate said beginning portion of said integration phase; and
opening at least two of said closed switches in succession such that said circuit element is stepped up through a plurality of discrete resistances to said first resistance during said integration phase.

12. The method as recited in claim 11, further comprising:
selectively opening said first switch at a later portion, than said beginning portion, of said integration phase such that said circuit element is altered from said second resistance to said first resistance.

13. The method as recited in claim 12, wherein said selectively opening said first switch at a later portion, than said beginning portion, of said integration phase such that said circuit element is altered from said second resistance to said first resistance comprises:
selectively setting a cutoff frequency of an anti-aliasing low pass filter at a frequency between 800 Khz and 1.5 Mhz.

14. The method as recited in claim 12, further comprising:
utilizing said first switch to alter said circuit element from said second resistance to said first resistance during each of a plurality of integration phases of said charge integrator.

* * * * *